(12) United States Patent
Hayashi et al.

(10) Patent No.: US 8,250,180 B2
(45) Date of Patent: Aug. 21, 2012

(54) CONTENT DELIVERY APPARATUS AND CONTENT DELIVERY METHOD USING THE SAME

(75) Inventors: Yoshihiro Hayashi, Odawara (JP); Tadashi Takeuchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 308 days.

(21) Appl. No.: 12/216,208

(22) Filed: Jul. 1, 2008

(65) Prior Publication Data

US 2009/0265446 A1   Oct. 22, 2009

(30) Foreign Application Priority Data

Apr. 21, 2008 (JP) ................................. 2008-110420

(51) Int. Cl.
*G06F 15/16* (2006.01)

(52) U.S. Cl. ......... 709/219; 709/203; 709/245; 709/246

(58) Field of Classification Search .................. 709/203, 709/219, 245, 246
See application file for complete search history.

(56) References Cited

U.S. PATENT DOCUMENTS

| | | | |
|---|---|---|---|
| 7,664,854 B2 * | 2/2010 | Fukasawa et al. ............ | 709/225 |
| 2002/0078180 A1 | 6/2002 | Miyazawa | |
| 2003/0093488 A1 | 5/2003 | Yoshida et al. | |
| 2004/0267908 A1 * | 12/2004 | Doi et al. ...................... | 709/219 |
| 2005/0223107 A1 | 10/2005 | Mine et al. | |
| 2005/0259954 A1 * | 11/2005 | Ando et al. .................... | 386/46 |

FOREIGN PATENT DOCUMENTS

| | | |
|---|---|---|
| JP | 59-017651 A | 1/1984 |
| JP | 2000-207339 A | 7/2000 |
| JP | 2002-202936 A | 7/2002 |
| JP | 2003-067526 A | 3/2003 |
| JP | 2003-153229 | 5/2003 |
| JP | 2005-295467 | 10/2005 |

OTHER PUBLICATIONS

Office Action from the Japanese Patent Office in the corresponding Japanese Appln. No. 2008-110420 dated Jan. 24, 2012 and its English translation.

* cited by examiner

*Primary Examiner* — Duyen Doan
(74) *Attorney, Agent, or Firm* — Stites & Harbison, PLLC; Juan Carlos A. Marquez, Esq

(57) ABSTRACT

A content delivery system includes a delivery server, a storage apparatus having a logical unit for storing data regarding content items, and a management apparatus having a content management unit for managing a delivery server. The delivery server includes a conversion unit and a delivery unit. The conversion units acquires original data regarding a content item from an external origin server in response to a content addition request from the content management unit, converts the original data to data for delivery, and stores the content data for delivery in the first logical unit. The delivery unit reads, in response to a content delivery request from the client, the data for delivery from the logical unit and transmits it to the client.

11 Claims, 23 Drawing Sheets

FIG. 5

CONTROL TABLE 500

| REFERENCE NAME | DISK ID | CONTENT ID | DELIVERY START DATE/TIME | DELIVERY END DATE/TIME |
|---|---|---|---|---|
| /trailer.wmv | 25 | A | - | 2008/2/6 19:00 |
| /newtitle/chapter01.wmv | 25 | B | 2008/2/6 19:00 | 2008/2/20 19:00 |
| /newtitle/chapter02.wmv | 25 | C | 2008/2/13 19:00 | 2008/2/27 19:00 |
| /newtitle/chapter03.wmv | 26 | A | 2008/2/20 19:00 | 2008/3/5 19:00 |
| /newtitle/chapter04.wmv | 26 | B | 2008/2/27 19:00 | 2008/3/12 9:00 |
| /adv/newpc.wmv | 26 | C | 2008/5/5 9:00 | - |

RECOVERY TABLE 600

| REFERENCE NAME | DISK ID | CONTENT ID | ACQUISITION SOURCE ADDRESS |
|---|---|---|---|
| /trailer.wmv | 25 | A | http://originserv2/trailer.wmv |
| /newtitle/chapter01.wmv | 25 | B | http://originserv1/title1/chapter01.wmv |
| /newtitle/chapter02.wmv | 25 | C | http://originserv1/title1/chapter02.wmv |
| /newtitle/chapter03.wmv | 26 | A | http://originserv1/title1/chapter03.wmv |
| /newtitle/chapter04.wmv | 26 | B | http://originserv1/title1/chapter04.wmv |
| /adv/newpc.wmv | 26 | C | http://originserv2/advertisement/computer.wmv |

MANAGEMENT FILE 700

| #OPERATION | #REFERENCE NAME | #COPY-SOURCE ADDRESS | #DELIVERY START DATE/TIME | #DELIVERY END DATE/TIME | #OPERATION DELIVERY EXECUTION DATE/TIME |
|---|---|---|---|---|---|
| ADDITION | /trailer2.wmv | http://originserv2/trailer2.wmv | 2008/2/6 19:00 | 2008/3/5 19:00 | 2008/2/5 0:00 |
| DELETION | /newtitle/chapter1.wmv | - | - | - | 2008/2/7 22:00 |

OPERATION
  ⦿ ADDITION  ○ DELETION

REFERENCE NAME

COPY-SOURCE ADDRESS

DELIVERY START DATE/TIME

DELIVERY END DATE/TIME

OPERATION EXECUTION DATE/TIME

DECIDE

| REFERENCE NAME | DISK ID | CONTENT ID | DELIVERY START DATE/TIME | DELIVERY END DATE/TIME |
|---|---|---|---|---|
| /trailer.wmv | 25 | A | — | 2008/2/6 19:00 |
| /newtitle/chapter01.wmv | 25 | B | 2008/2/6 19:00 | 2008/2/20 19:00 |
| /newtitle/chapter02.wmv | 25 | C | 2008/2/13 19:00 | 2008/2/27 19:00 |
| /newtitle/chapter03.wmv | 26 | A | 2008/2/20 19:00 | 2008/3/5 19:00 |
| /newtitle/chapter04.wmv | 26 | B | 2008/2/27 19:00 | 2008/3/12 19:00 |
| /adv/newpc.wmv | 26 | C | 2008/5/5 9:00 | — |
| /trailer2.wmv | 25 | D | 2008/2/6 19:00 | 2008/3/5 19:00 |

FIG. 12

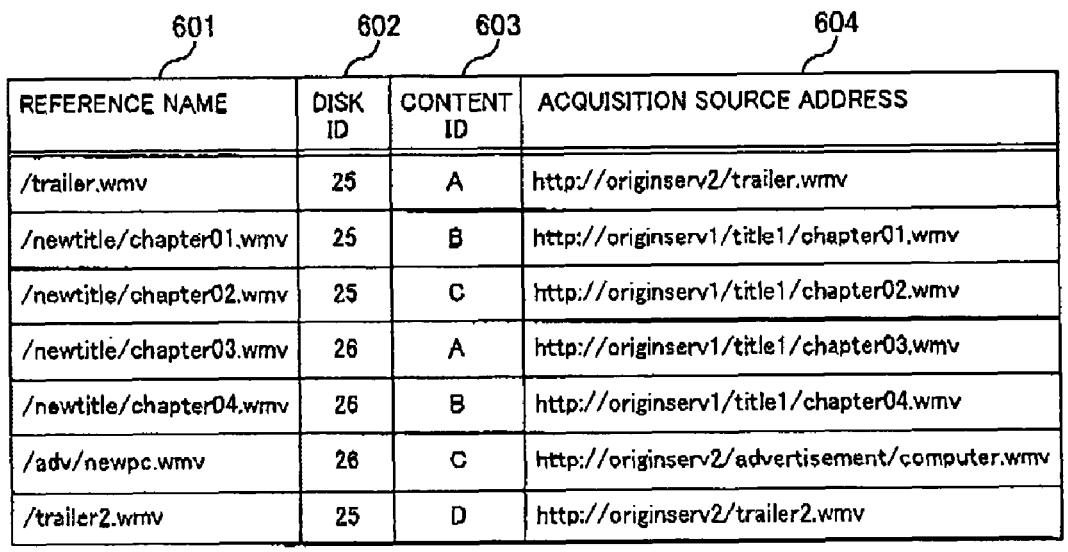

| REFERENCE NAME | DISK ID | CONTENT ID | ACQUISITION SOURCE ADDRESS |
|---|---|---|---|
| /trailer.wmv | 25 | A | http://originserv2/trailer.wmv |
| /newtitle/chapter01.wmv | 25 | B | http://originserv1/title1/chapter01.wmv |
| /newtitle/chapter02.wmv | 25 | C | http://originserv1/title1/chapter02.wmv |
| /newtitle/chapter03.wmv | 26 | A | http://originserv1/title1/chapter03.wmv |
| /newtitle/chapter04.wmv | 26 | B | http://originserv1/title1/chapter04.wmv |
| /adv/newpc.wmv | 26 | C | http://originserv2/advertisement/computer.wmv |
| /trailer2.wmv | 25 | D | http://originserv2/trailer2.wmv |

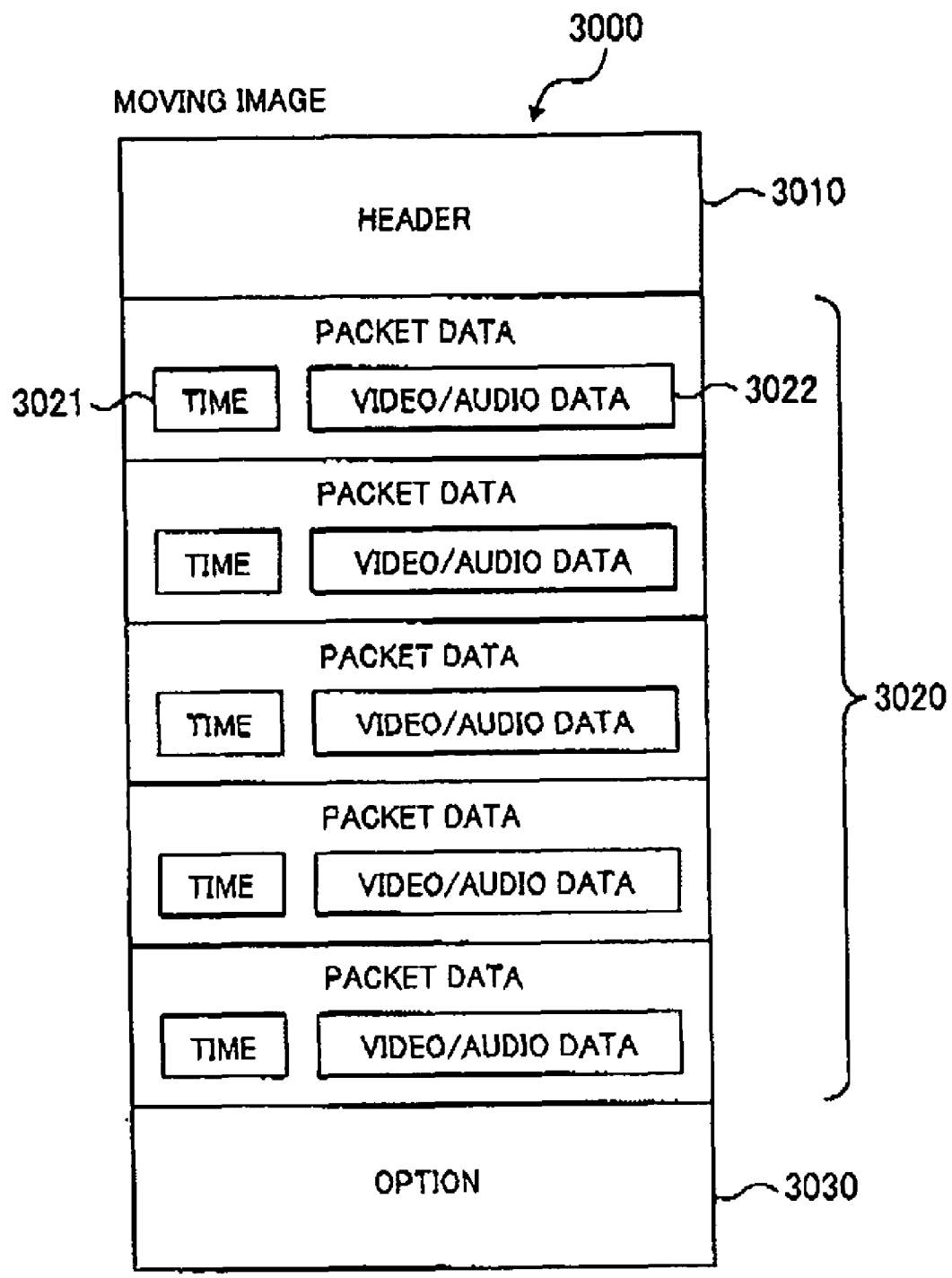

FIG. 16

HINT FILE 3300

| TIME 3310 | OFFSET 3320 |
|---|---|
| 0 | 0 |
| 1 | 1050 |
| 2 | 3156 |
| 3 | 5128 |
| 4 | 8842 |
| ... | ... |
| 297 | 41260930 |
| 298 | 41262525 |
| 299 | 41264126 |

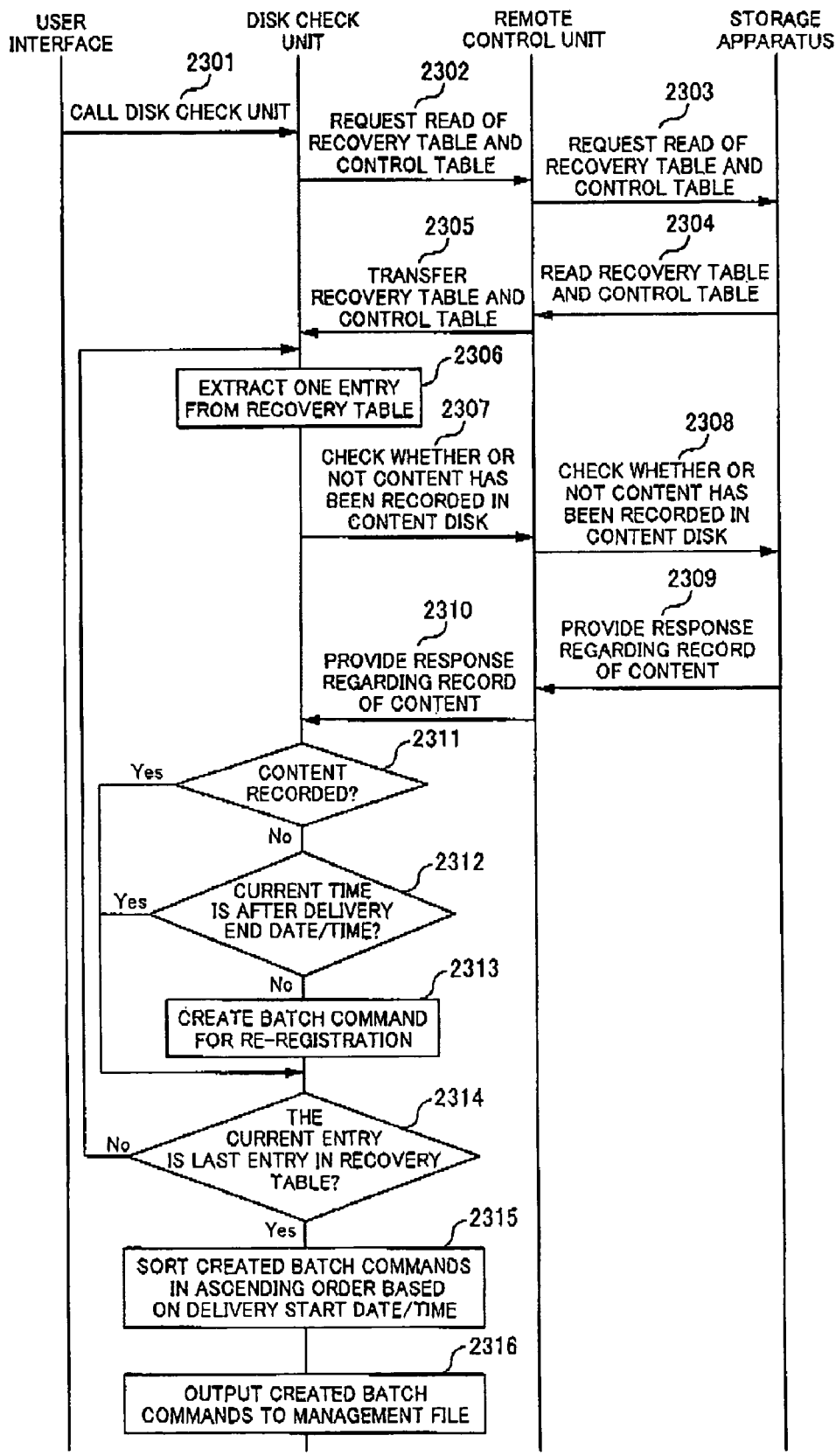

CONTENT DELIVERY APPARATUS AND CONTENT DELIVERY METHOD USING THE SAME

CROSS-REFERENCES TO RELATED APPLICATIONS

This application relates to and claims priority from Japanese Patent Application No. 2008-110420, filed on Apr. 21, 2008, the entire disclosure of which is incorporated herein by reference.

BACKGROUND

1. Field of the Invention

The present invention relates to a content delivery apparatus and a content delivery method using the same, and more specifically to a technique for acquiring content from an origin server computer storing content and delivering the acquired content to a client computer in accordance with a delivery request from the client computer.

2. Description of Related Art

Content delivery service, where content data, which is video/audio data that has been compressed and coded, is delivered by streaming in response to a request from a client, has been rapidly becoming popular.

Reference 1 discloses a cache server provided between a media server and a client. Specifically, in reference 1, when a delivery request for delivering a certain media file is issued from the client to the media server, the cache server receives the delivery request and delivers the relevant media file, which has been cached, by streaming. If the relevant media file has not been cached in the cache server, the media server delivers the media file to the client by streaming, and the cache server acquires the relevant media file at the same time (see reference 1; JP2003-153229 A).

Due to the rapid diffusion of the content delivery services these days, a need for a content delivery apparatus capable of simultaneously delivering plural pieces of content has increased.

However, capacity for delivering content by streaming per one server computer serving as the content delivery apparatus is limited, so receiving more delivery requests at the same time requires an increase in the number of server computers, and that results in an increase of cost.

In addition, the maximum permissible power per floor on which the server computers are provided needs to be taken into consideration and the power consumption of the server computers needs to be kept low in view of environmental issues these days, so it is difficult to simply increase the number of server computers.

SUMMARY

In light of the above circumstances, it is an object of this invention to provide a content delivery system capable of efficiently delivering content by streaming without increasing the capacity or number of server computers.

This invention has been made for solving the above problem and contains the features defining the invention and technical features described below.

Provided according to an aspect of this invention is a content delivery apparatus that includes a delivery server, a storage apparatus operatively connected to the delivery server and including a logical unit for storing data regarding content items, and a management apparatus operatively connected to the delivery server and including a content management unit configured to manage the delivery server and the storage apparatus. The delivery server includes a conversion unit and a delivery unit. The conversion unit is configured to acquire, in response to a content addition request from the content management unit, original data regarding a content item designated by the content addition request from an external origin server, to convert the acquired original data to data for delivery, and to store the data for delivery in the first logical unit. The delivery unit is configured to read from the logical unit, in response to a content delivery request from the client for requesting the delivery of the content item, the data for delivery and to transmit the read data for delivery to the client.

Provided according to another aspect of this invention is a content delivery method using a content delivery apparatus that includes a delivery server, a storage apparatus connected to the delivery server and a management apparatus connected to the delivery server. In the method, the management apparatus first transmits a content addition request to the delivery server in accordance with a management file. The delivery server acquires, in response to the content addition request, original data regarding a content item designated by the content addition request from an external origin server. The delivery server converts the acquired original data to data for delivery, and stores the data for delivery in a logical unit formed in the storage apparatus. Then, the delivery server reads from the logical unit the data for delivery in response to a content delivery request transmitted from the client and transmitting the read data for delivery to the client.

In this invention, since the content data acquired from the origin server is converted to content data for delivery and then stored in the storage apparatus, the delivery server can deliver, even when receiving many content delivery requests at the same time, the content without the delay caused by high load.

In addition, in this invention, even when the storage apparatus stores the content data for delivery, the delivery server can deliver the content data only during a deliverable time, so this invention can also cope with issues relating to intellectual property rights for content.

Other aspects and advantages of the invention will be apparent from the following description and the appended claims.

BRIEF DESCRIPTION OF THE DRAWINGS

FIG. 5 shows an example of a control table in the storage apparatus according to an embodiment of this invention.

FIG. 6 shows an example of a recovery table in the storage apparatus according to an embodiment of this invention.

FIG. 7 shows an example of a management file in a management apparatus according to an embodiment of this invention.

FIG. 9 is a diagram showing an example of a user interface in the management apparatus according to an embodiment of this invention.

FIG. 12 shows an example of a recovery table in the storage apparatus according to an embodiment of this invention.

FIG. 13 is a diagram showing an example of the data structure of post-conversion content in the content delivery system according to an embodiment of this invention.

FIG. 16 is a diagram showing an example of a hint file in content for delivery according to an embodiment of this invention.

FIG. 23 is a sequence chart explaining the disk recovery processing in the management apparatus according to an embodiment of this invention.

DETAILED DESCRIPTION OF PREFERRED EMBODIMENTS

Embodiments of this invention will be described with reference to the attached drawings.

Figure 1:
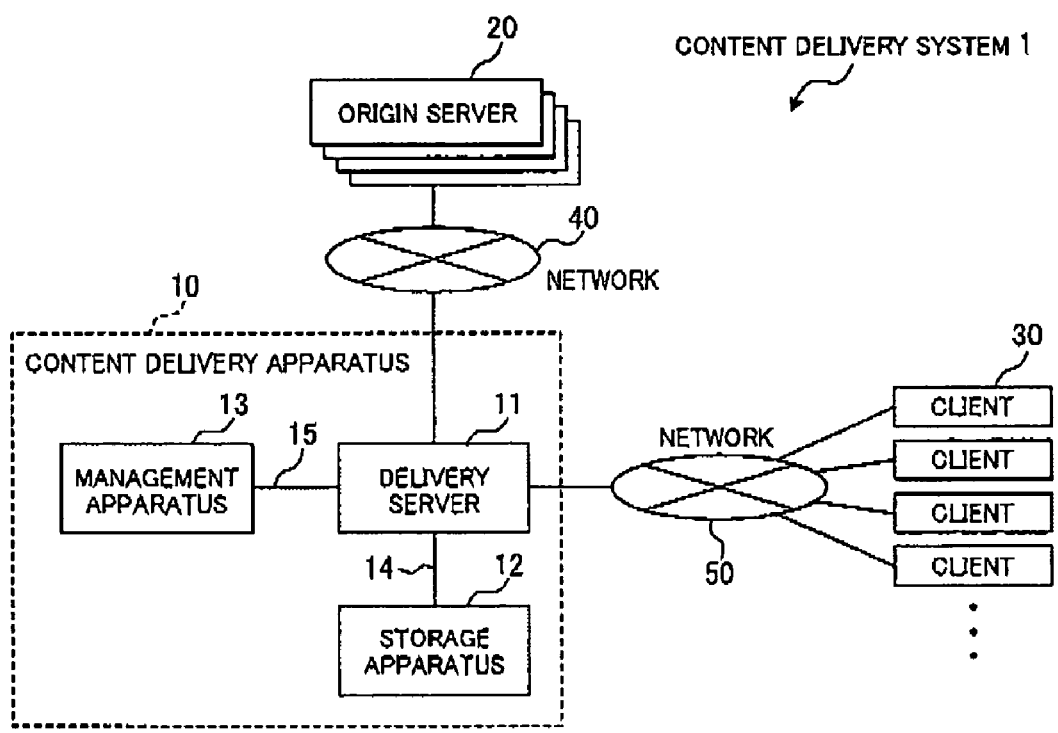
FIG. 1 is a diagram showing the entire configuration of a content delivery system according to an embodiment of this invention.

FIG. 1 is a diagram showing the entire configuration of a content delivery system according to an embodiment of this invention. As shown in FIG. 1, the content delivery system 1 in this embodiment includes a content delivery apparatus 10, a plurality of origin servers 20 and a plurality of clients 30.

The content delivery apparatus 10 includes a delivery server 11, a storage apparatus 12 and a management apparatus 13. The content delivery apparatus 10 is connected to the plurality of origin servers 20 via a network 40. The content delivery apparatus 10 is also connected to a plurality of clients 30 via a network 50.

The delivery server 11 is a computer for providing a content delivery service for the clients 30. Typically, the delivery server 11 reads from the storage apparatus 12, in response to a content delivery request from the clients 30, streaming-type digital content (hereinafter simply referred to as "content") corresponding to the request and then transmits the read content to the clients 30.

The storage apparatus 12 stores content such as music and movie that can be delivered to the clients 30. The content is, for example, a video/audio data stream that meets a predetermined compression standard (coding standard), but it is not limited to such a data stream. The delivery server 11 and the storage apparatus 12 are connected to each other via a network 14 such as a SAN.

The management apparatus 13 is an apparatus used by a system administrator for managing the delivery server 11 and the storage apparatus 12, and a generally-used computer may typically be used for the management apparatus 13. Although the management apparatus 13 is connected to the delivery server 11 via a management network 15 such as a LAN in this example, it may be connected directly to the storage apparatus 12, and not via the delivery server 11.

The origin servers 20 each are a system for storing content such as music and movies provided at a charge/for free to a user. The origin server 20 may alternatively be a distributed system consisting of a plurality of computers. A unique ID is assigned to each of the origin servers 20.

The origin servers 20 are typically handled by a content provider. However, the content provider may be identical to a service provider to which the content delivery apparatus 10 belongs. Although the user may directly access the origin servers 20 by operating the client 30, the user receives content via the content delivery apparatus 10 in this embodiment.

The client 30 is a computer used by a user who desires to use content and is connected to the content delivery apparatus 10 via the network 50. The client 30 operated by the user transmits a content delivery request to the delivery server 11 via the network 50, receives the content transmitted from the delivery server 11 in response to the request, and provides the received content to the user.

Figure 2:
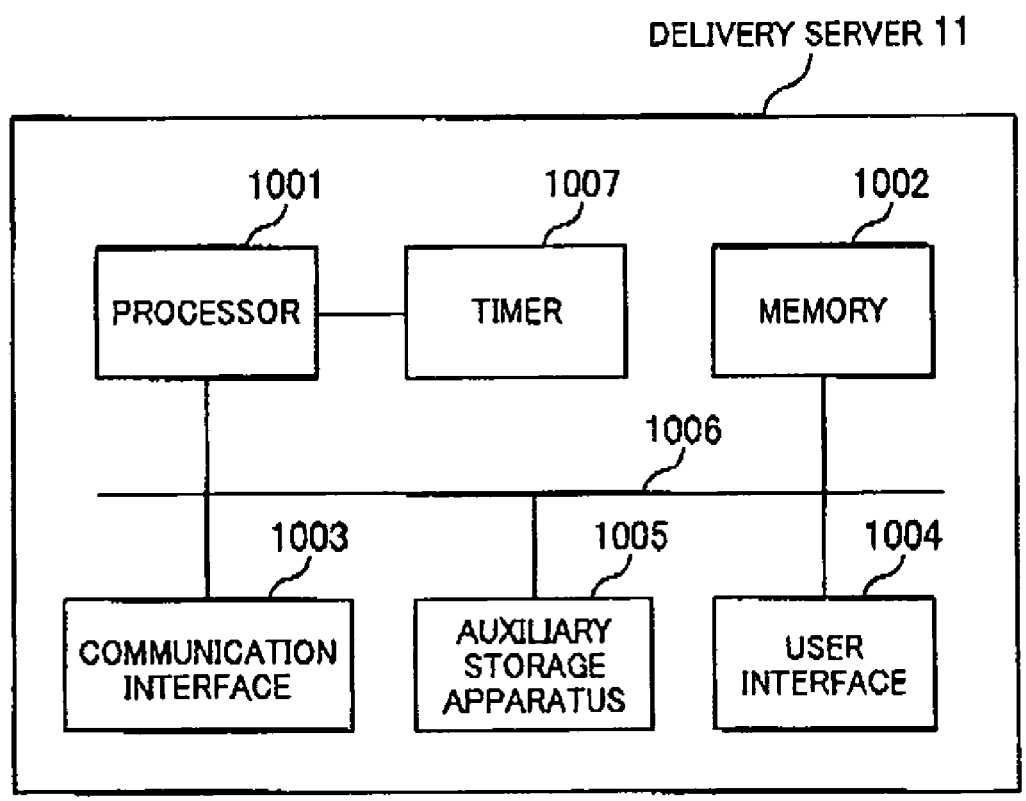
FIG. 2 is a diagram showing the hardware configuration of a delivery server according to an embodiment of this invention.

FIG. 2 shows the hardware configuration of the delivery server 11 in this embodiment. As shown in FIG. 2, the delivery server 11 includes: a processor 1001 that performs arithmetic processing, a memory 1002 serving as a main memory for the processor 1001; a communication interface (I/F) 1003 used for communication with external apparatuses; a user interface 1004 such as a display, a keyboard and a mouse; and an auxiliary storage apparatus 1005, and these components are connected to each other via an internal bus 1006. The delivery server 11 includes a timer 1007 for providing current time information to the processor 1001.

The processor 1001 comprehensively controls the operation of the delivery server 11 and executes various programs in the memory 1002 to have the delivery server 11 perform relevant processing in cooperation with other hardware resources. The processor 1001 judges whether or not it is currently within a deliverable time period for the requested content, based on time information from the timer 1007.

The memory 1002 is configured from, for example, a RAM or a ROM and stores various programs and data used by the processor 1001. A part or all of the programs are loaded in the memory 1002 by the auxiliary storage apparatus 1005. In this embodiment, in particular, a remote control program, a delivery program and a conversion program are prepared.

The management apparatus 13 may also be configured from a computer, so its hardware configuration is the same as, or equivalent to, that for the delivery server 11. The management apparatus 13 in this embodiment is installed with a remote control program, a disk check program and a content management program.

Figure 3:
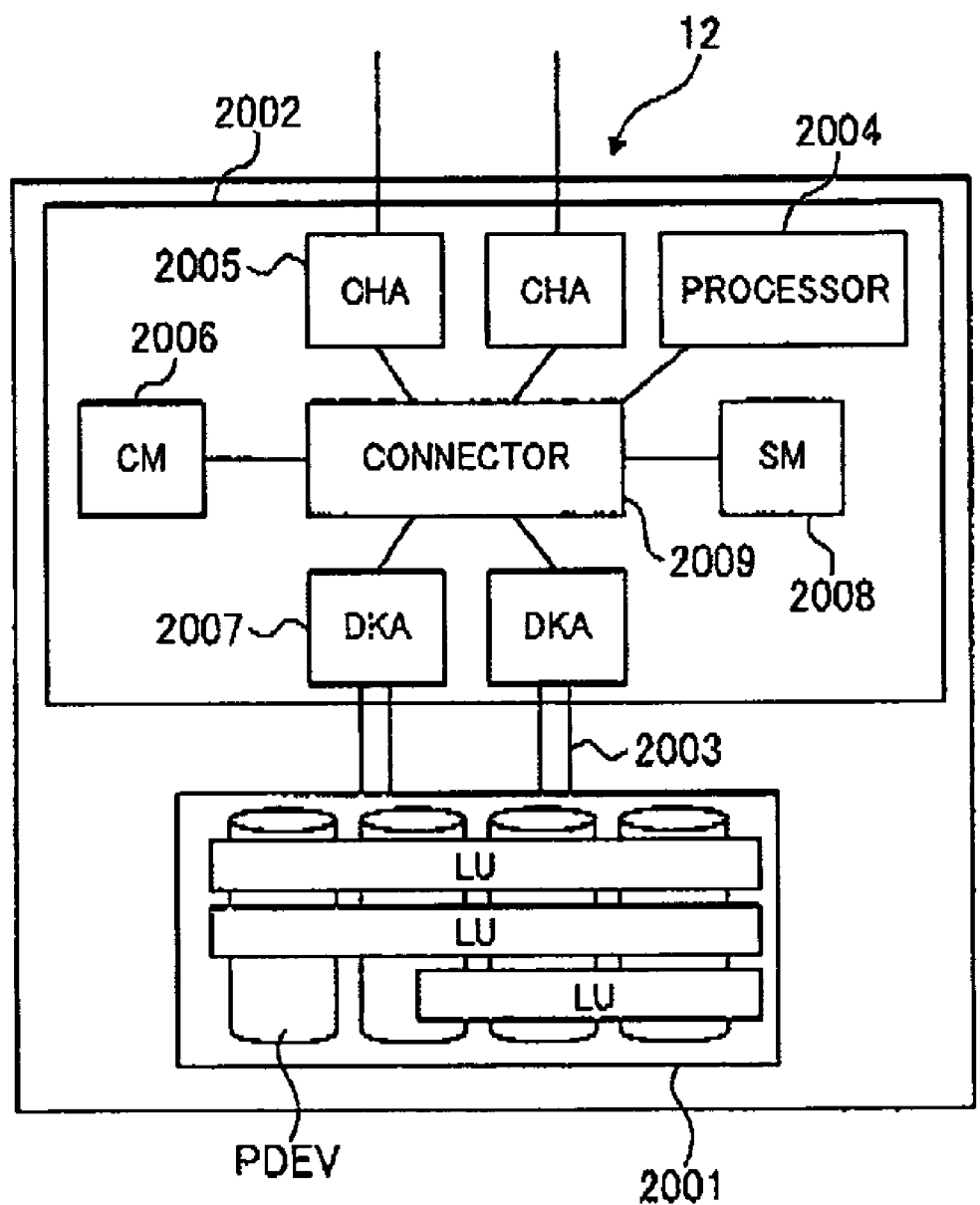
FIG. 3 is a diagram showing the configuration of a storage apparatus according to an embodiment of this invention.

FIG. 3 is a diagram showing the configuration of the storage apparatus 12 in this embodiment. As shown in FIG. 3, the storage apparatus 12 includes: a drive unit 2001 that includes a plurality of physical devices PDEV; and a controller 2002 that controls the delivery server 11's I/O accesses, such as reading and writing, to the drive unit 2001. The drive unit 2001 and the controller 2002 are connected to each other via a disk channel 2003.

The drive unit 2001 includes a storage medium such as a hard disk drive and a nonvolatile memory (solid state device). In the drive unit 2001, virtual devices are formed under the RAID control of the controller 2002 and a logical unit is assigned to each virtual device. The logical unit is a logical storage apparatus that can be recognized by the delivery server 11 (host system). As will be described later, each logical unit is assigned a certain role and used as a disk according to said assigned role.

The controller 2002 typically includes a processor 2004, channel adapters (CHA) 2005, a cache memory (CM) 2006, disk adapters (DKA) 2007 and a shared memory (SM) 2008, these components connected to each other via a connector 2009.

The processor 2004 is a chip for overall control of the storage apparatus 12. The channel adapters 2005 each have plural ports (not shown) and serve as a communication interface for making I/O access-based communication with the delivery server 11 connected via the ports. The cache memory 2006 is used for exchanging data between the channel adapter 2005 and the disk adapter 2007. The disk adapters 2007 each have plural ports (not shown) and serve as an interface for controlling I/O accesses from the drive unit 2001 connected to the ports via the disk channel 2003. The shared memory 2008 is referred to by each component in the storage apparatus 12 and is configured from a RAM, a ROM, a nonvolatile RAM or the like. The connector 2009 includes a switching device such as a cross bar switch, and arbitrates conflict between input data signals, switches paths for the data signals and constructs paths between source components and destination components.

Figure 4:
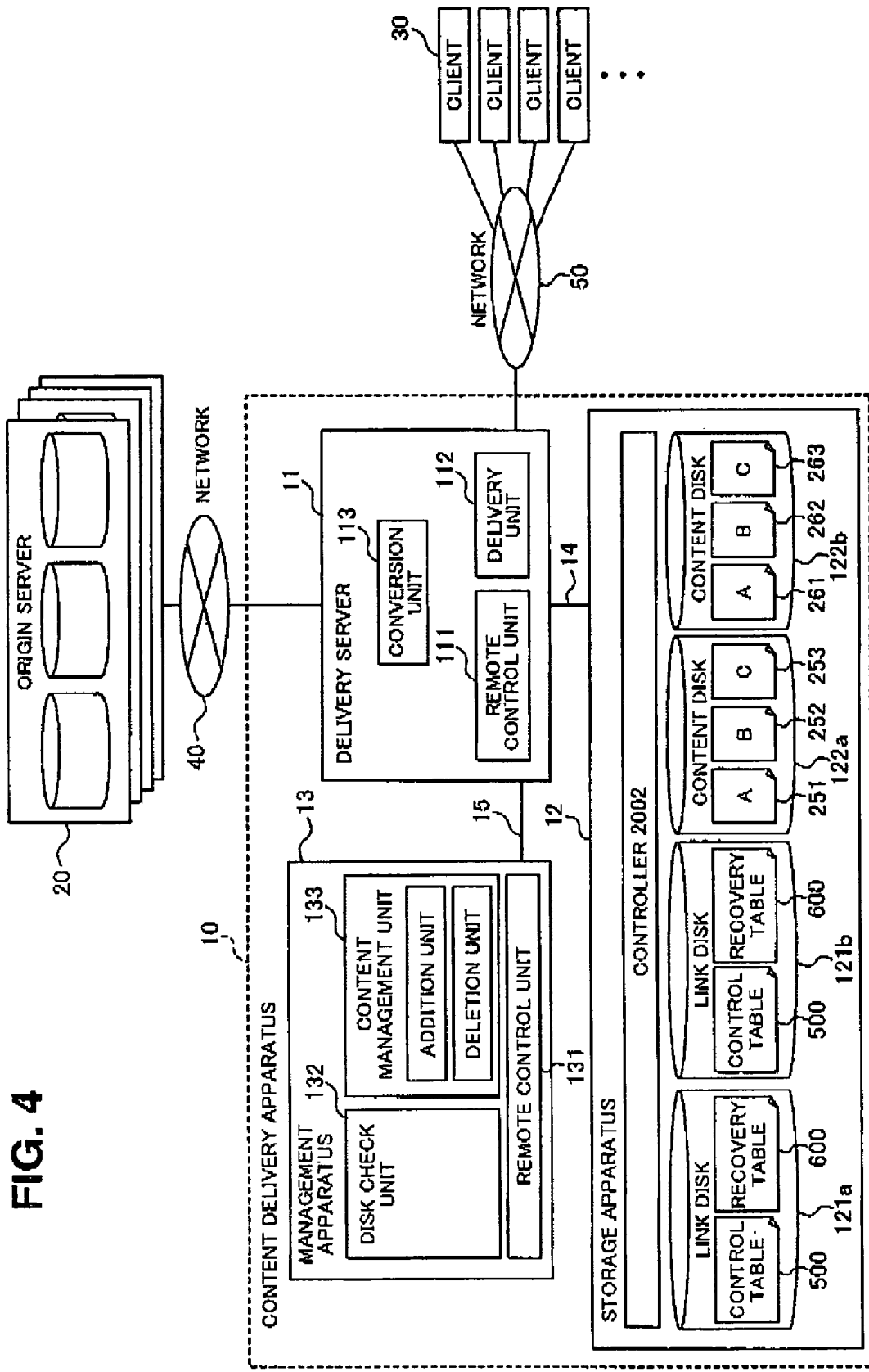
FIG. 4 is a diagram explaining the functional configuration of the content delivery system according to an embodiment of this invention.

FIG. 4 is a diagram explaining the functional configurations of the delivery server 11, the storage apparatus 12 and the management apparatus 13 in the content delivery apparatus 10 shown in FIG. 1.

The delivery server 11 includes a remote control unit 111, a delivery unit 112 and a conversion unit 113. By executing the above-described programs, the delivery server 11 cooperates with the hardware resources to realize these functional elements.

The remote control unit 111 communicates with a remote control unit 131 in the management apparatus 13 and makes a response to certain commands from the management apparatus 13. For example, the remote control unit 111 invokes a conversion unit 113 or the delivery unit 112 under the control of the management apparatus 13. The remote control unit 111 issues an I/O request to the storage apparatus 12 under the control of the management apparatus 13 and gives an I/O response to the management apparatus 13.

The delivery unit 112 reads, in response to a content delivery request transmitted from the client 30, the requested content from the storage apparatus 12 and transmits the read content to the client 30.

The conversion unit 113 provides control for acquiring content stored in the origin servers 20 using a predetermined file transfer protocol such as "http" or a "cifs," converting the format of the content to one with an application layer header attached and storing the content in the storage apparatus 12.

The storage apparatus 12 includes a drive unit 2001 such as a storage medium for storing data as digital content. The storage apparatus 12 may be configured by a hard disk drive group, a nonvolatile semiconductor memory or the like. The storage apparatus 12 employs, for example, a RAID configuration in order to meet the need for large capacity and high reliability.

One or more logical units (LUs) are formed in the drive unit 2001 in the storage apparatus 12. The logical units in this embodiment are each assigned a role for serving as a link disk 121 or a role for serving as a content disk 122. The link disk 121 and the content disk 122 are each assigned a disk ID, as will be described later.

The link disk 121 is a logical unit for storing management tables, such as a control table 500 and a recovery table 600. In this embodiment, the link disk 121 is configured from a link disk 121a and its copy (link disk 121b) from the perspective of fault tolerance. Accordingly, if the content of the link disk 121 is updated, that means both the link disks 121a and 121b are updated.

The content disk 122 is a logical unit for storing data constituting the content acquired from the origin servers 20. In this example, the content disk 122a stores content A, content B and content C. The content disk 122b also stores content A, content B and content C. Content A in the content disk 122a and content A in the content disk 122b are different from each other. Likewise, content B and content C in the content disk 122a and those in content disk 122c are also different from each other.

The management apparatus 13 typically includes the remote control unit 131, a disk check unit 132, and a content management unit 133. By way of executing programs under the control of the processor, these units may be implemented in cooperation with other hardware resources.

The remote control unit 131 may be implemented by a program for communicating with the remote control unit 111 in the delivery server 11 and controlling I/O access from the management apparatus 13 to the storage apparatus 12 or commanding starting of the conversion unit 113.

The disk check unit 132 and the content management unit 133 realize their respective functions by calling the remote control unit 131. The disk check unit 132 may be implemented by a program for referring to the recovery table 600 to check if failure such as data inconsistency or data loss has occurred in the content disk 122 and for solving the failure if there is any.

The content management unit 133 may be implemented by a program for providing a user interface for a system administrator for creating a management file regarding addition/deletion for content and for adding/deleting content to/from the content disk 122 in the storage apparatus 12 based on the created management file.

FIG. 5 shows an example of the control table 500 in the storage apparatus 12 in this embodiment. As shown in FIG. 5, the control table 500 includes a reference name field 501, a disk ID field 502, a content ID field 503, a delivery start date/time field 504 and a delivery end date/time field 505.

The reference name field 501 shows a reference name for the client 30 to specify content for which the client 30 requests delivery. The disk ID field 502 and the content ID field 503 each show a unique identifier for specifying the content stored in the storage apparatus 12. For example, in FIG. 5, the content having the reference name "/trailer.wmv" is assigned the ID "A" and stored in the logical unit LU having the ID "25." The delivery start date/time field 504 shows the time when delivery service for the relevant content starts, while the delivery end date/time field 505 shows the time when the delivery service for the relevant content ends.

FIG. 6 shows an example of the recovery table 600 in the storage apparatus 12 in this embodiment. As shown in FIG. 6, the recovery table 600 includes a reference name field 601, a disk ID field 602, a content ID field 603 and a source address field 604.

The reference name field 601 shows a reference name for the client 30 to specify content for which the client 30 requests delivery. The disk ID field 602 and the content ID field 603 each show a unique identifier for specifying the content stored in the storage apparatus 12. The source address field 604 shows the address from which the content stored in the storage apparatus 12 is acquired. For example, a URL may be used as the source address.

FIG. 7 is a diagram showing an example of a management file 700 in the management apparatus 13 in this embodiment. The management file 700 is a file having, for example, a text format, in which operation for the content disk 122 (e.g., adding or deleting content) is described.

As shown in FIG. 7, a desired operation and options that are described with spaces between them are described in each row in the management file 700. Specifically, operations such as "addition" or "deletion" are described with an operation name 701. The "addition" indicates adding new content to the content disk 122, whereas "deletion" indicates deleting content that has already been added to the content disk 122. An addition module or a deletion module may be invoked in accordance with a designated operation. A reference name 702 shows a reference name for specifying content as an operation target. A copy-source address 703 shows an address for acquiring content to be stored in the storage apparatus 12. The copy-source address 703 corresponds to the source address in the corresponding source address field 604 in the recovery table 600. A delivery start date/time 704 shows the time when the delivery service for the relevant content starts, while a delivery end date/time 705 shows the time when the delivery service for the relevant content ends. An operation execution date/time 706 shows the date and time when the described operation is to be executed. The content management unit 133 refers to this operation execution date/time 706 and executes the operation specified by the operation name 701 when the current time reaches the time specified in the operation execution date/time 706.

Figure 8:
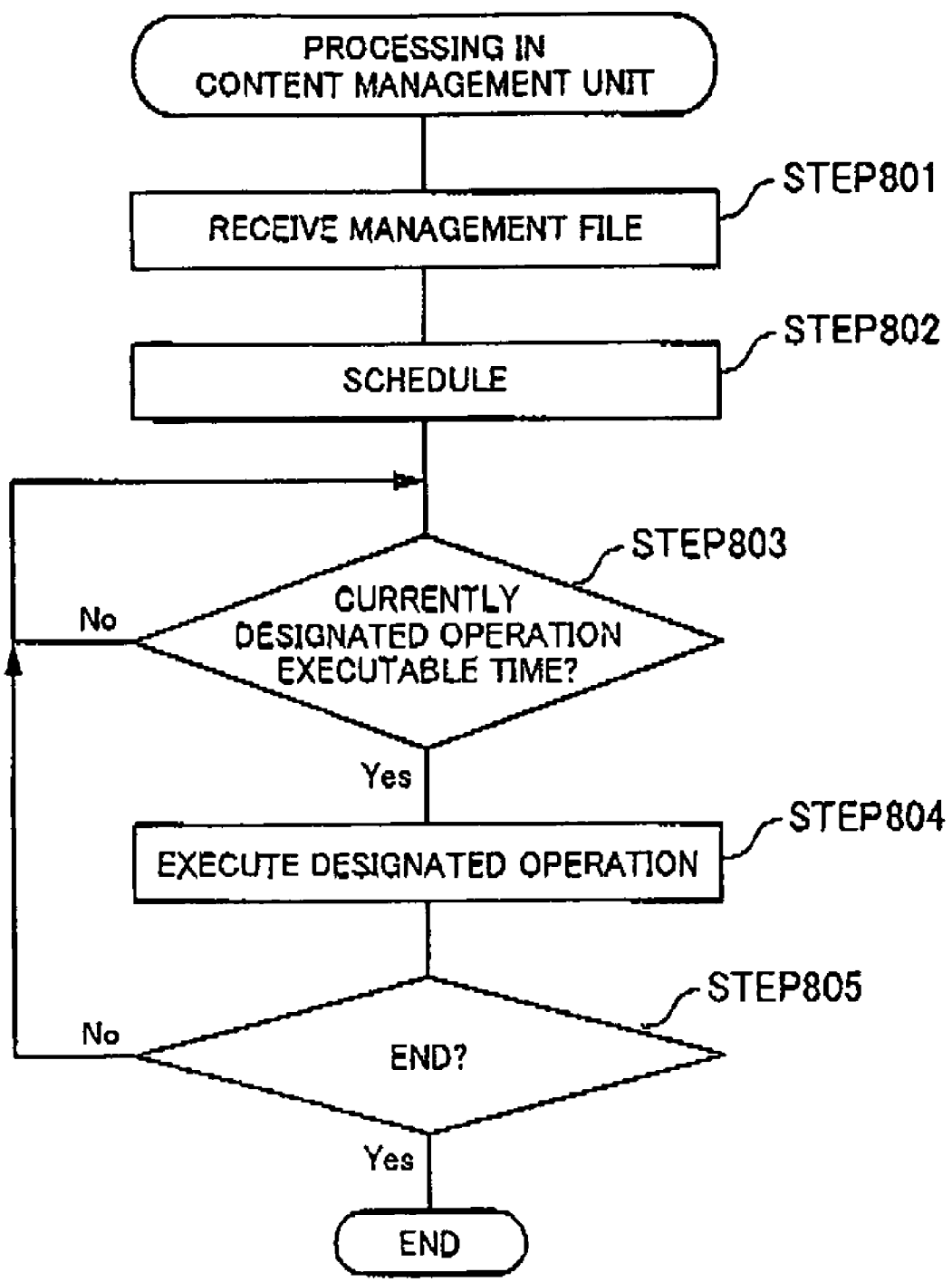
FIG. 8 is a flowchart explaining processing by a content management unit in the management apparatus according to an embodiment of this invention.

FIG. 8 is a flowchart explaining processing by the content management unit 133 in the management apparatus 13 according to an embodiment of this invention.

First, when the system administrator of the content delivery apparatus 10 creates a management file 700 regarding addition/deletion for content, the content management unit 133 receives the created management file 700 (step 801). The management apparatus 13 provides a user interface 900 as shown in FIG. 9 to the system administrator, so that the system administrator can operate this user interface 900 and interactively create the management file.

The content management unit 133 next interprets the content of the received management file 700 and makes a schedule accordingly (step 802). The content management unit 133 follows the schedule and executes, when the current time reaches the operation execution date/time (step 803: Yes), the designated operation (step 804). For example, the management file 700 in FIG. 7 indicates that the operation "addition" described in the first row is executed on "Feb. 5, 2008" as specified in the operation execution date/time field.

The content management unit 133 then judges whether or not all the scheduled operations have been performed (step 805), and repeats the above processing until the execution of all the operations is complete.

Figure 10:
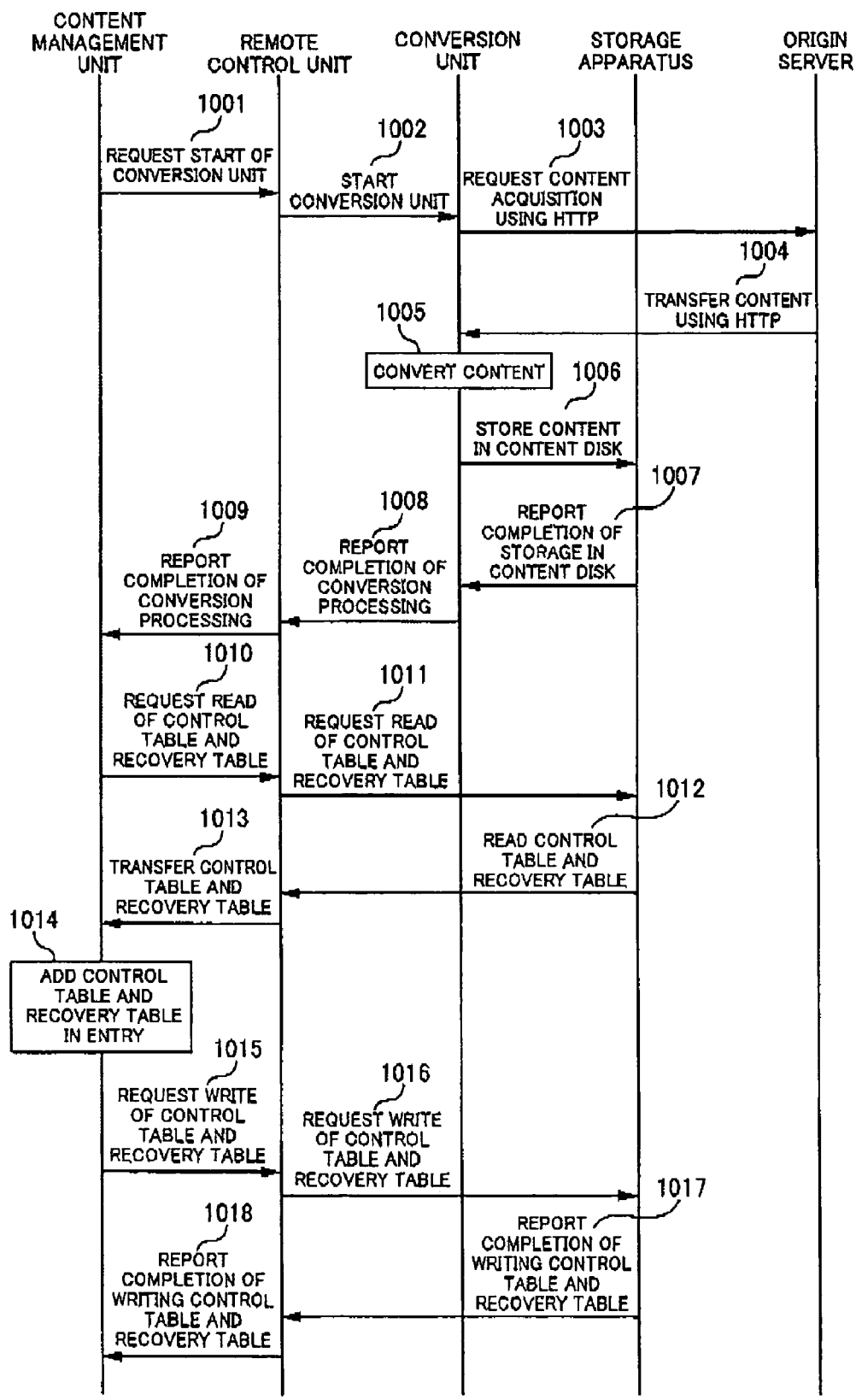
FIG. 10 is a sequence chart explaining content addition processing in the content delivery system according to an embodiment of this invention.

FIG. 10 is a sequence chart explaining content addition processing in the content delivery system 1 in this embodiment.

As shown in FIG. 10, first, the content management unit 133 in the management apparatus 13 designates an option and requests the remote control unit 131 to start the conversion unit 113 in the delivery server 11, in order to execute the addition operation for content (step 1001). The remote control unit 131 receiving this request communicates with the remote control unit 111 in the delivery server 11, starts the conversion unit 113 and transfers the designated option (step 1002). Examples of the option include an acquisition-source address, the disk ID for identifying the content disk 122 in which the acquired content is to be stored, and the content ID for identifying that content. The acquisition-source address is a URL described in the copy-source address in the management file 700. The content disk 122 having the largest free space is preferably selected as the content disk 122 in which the acquired content is to be stored. In this example, the acquisition-target address http://originserv2/trailer2.wmv, the disk ID "25" and the content ID "D" are designated as options.

The conversion unit 113 accesses the origin server 20 in accordance with the designated acquisition-source address and transmits a transmission request for content (step 1003). The origin server 20 transmits the designated content to the delivery server 11 in response to this transmission request (step 1004). With this processing, the conversion unit 113 acquires the specified content from the origin server 20.

When acquiring the content from the origin server 20, the conversion unit 113 converts the acquired content to content having a format suitable for delivery (step 1005). Specifically, for example, the conversion unit 113 converts the acquired content to content consisting of three files. The conversion processing for content will be described later.

The conversion unit 113 stores the converted content in the designated content disk 122 (step 1006). When receiving a report from the storage apparatus indicating that the content has been stored (step 1007), the conversion unit 113 reports the completion of processing to the content management unit 133 via the remote control units 111 and 131 (step 1008 and step 1009).

Next, the content management unit 133 transmits a transmission request for the control table 500 and the recovery table 600 to the remote control unit 111 in the delivery server 11 via the remote control unit 131 in order to update the control table 500 and the recovery table 600 in the link disk 121 (step 1010 and step 1011). In response to this transmission request, the remote control unit 111 accesses the link disk 121 in the storage apparatus 12, reads the designated control table 500 and recovery table 600 from the link disk 121, and transmits the read control table 500 and recovery table 600 to the management apparatus 13 (step 1012 and step 1013).

Figure 11:
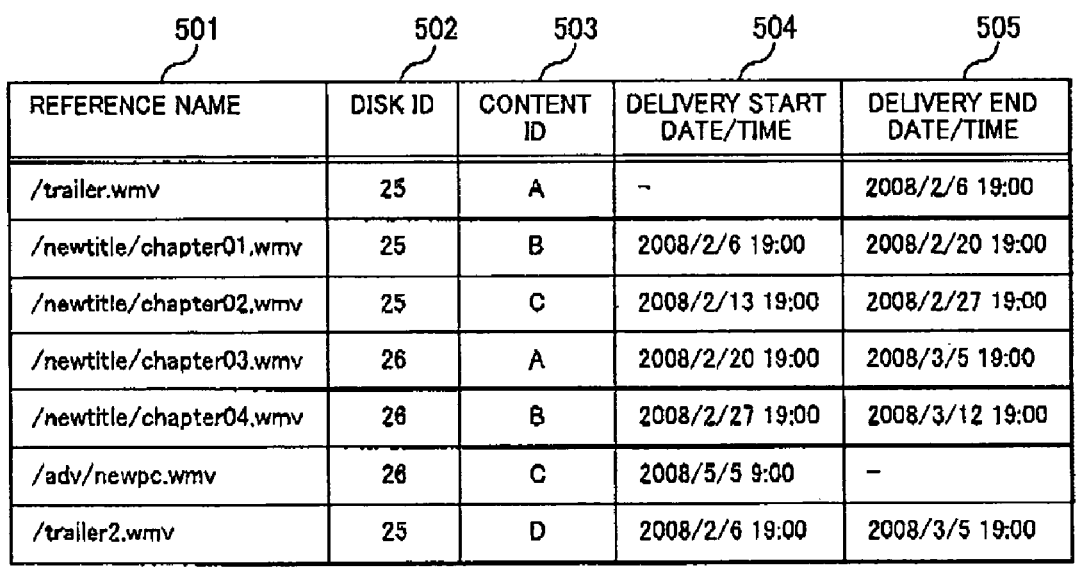
FIG. 11 shows an example of a control table in the storage apparatus according to an embodiment of this invention.

The content management unit 133, having acquired the control table 500 and the recovery table 600, adds an entry regarding the acquired content respectively to the control table 500 and recovery table 600 (step 1014). FIG. 11 shows an example of the updated control table 500, and FIG. 12 shows an example of the updated recovery table 600.

The content management unit 133 then transmits, in order to update the control table 500 and recovery table 600, having the newly-added entry, in the link disk 121, a write request for the control table 500 and recovery table 600 to the remote control unit 111 via the remote control unit 131 (step 1015). The remote control unit 111 in the delivery server 11 receiving this request stores the control table 500 and recovery table 600 transmitted from the management apparatus 13 in a predetermined area in the link disk 121 (step 1016). With this processing, the storage apparatus 12 reports the completion of the write processing to the content management unit 133 (step 1017 and step 1018).

As described above, the content management unit 133 provides control so that the content is acquired from the origin server 20, the acquired content is converted to the content for delivery, and the converted content is stored in the storage apparatus 12, in accordance with the "addition" operation described in the management file 700.

The conversion processing will be described as follows. As described above, when acquiring the content from the origin server 20, the conversion unit 113 in the delivery server 11 converts this content to content for delivery that consists of three files.

FIG. 13 is a diagram showing an example of pre-conversion content data in the content delivery system 1 in this embodiment.

As shown in FIG. 13, pre-conversion content 3000 includes a header 3010, packet data 3020 and an option 3030. The header 3010 includes, for example, information about the resolution and frame rate of the content and a decoder to be used. The packet data 3020 includes time 3021 and video/audio data 3022. The time 3021 is time management information used when the content is reproduced and indicates a reproduction-time base position, from the top of the content, for the relevant video/audio data 3022. The option 3030 defines, for example, the correlation between the time used when fast-forwarding or rewinding the content and the packet data 3020 to be reproduced.

Figure 14:
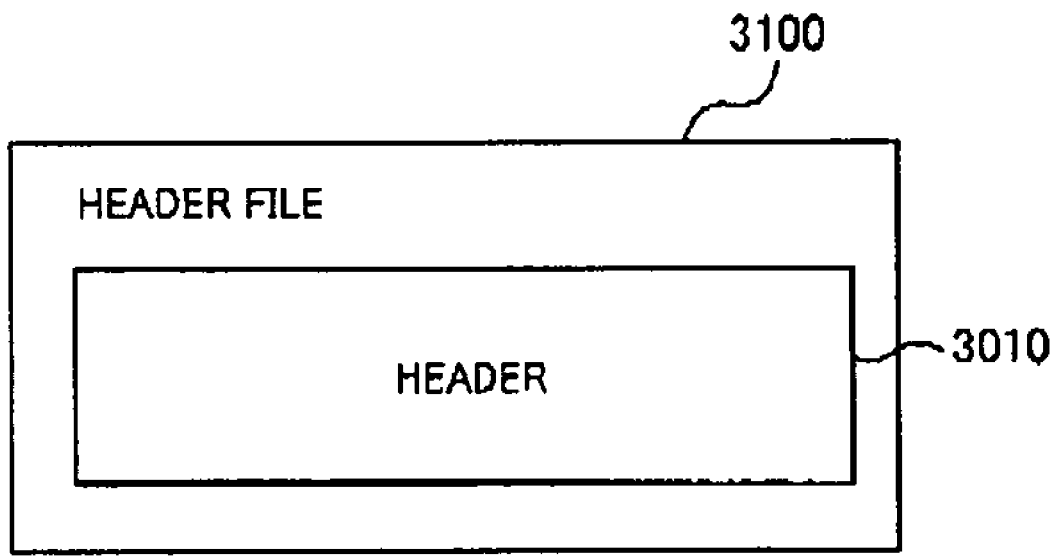
FIG. 14 is a diagram showing an example of a header file for content for delivery in the content delivery system according to an embodiment of this invention.
Figure 15:
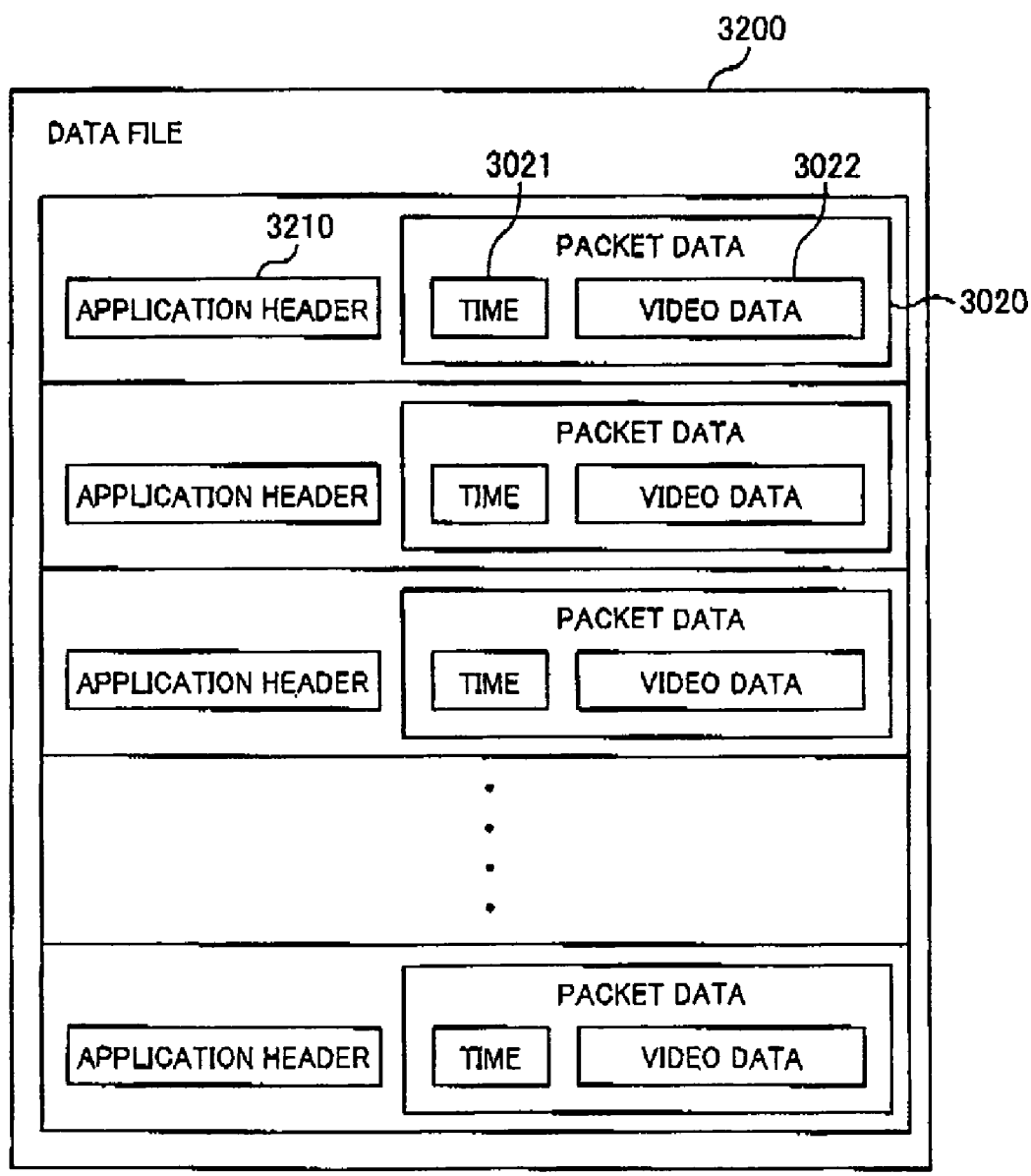
FIG. 15 is a diagram showing an example of a data file for content for delivery in the content delivery system according to an embodiment of this invention.

FIGS. 14 to 16 are diagrams showing an example of post-conversion content data in the content delivery system 1 in this embodiment. Specifically, FIG. 14 shows the header file 3100 in the content for delivery, FIG. 15 shows a data file 3200 in the content for delivery and FIG. 16 shows a hint file 3300 in the content for delivery.

The header file 3100 corresponds to the header 3010 in the pre-conversion content 3000. The data file 3200 is a file that stores in sequence datasets each containing the packet data 3020 with an application head 3210 attached. The application header 3210 includes an attribute for data included in the packet data 3020, the size of the packet data 3020, an http header used for delivery, etc. The hint file 3300 includes a table in which a time 3310 and an offset 3320 are correlated. The hint file 3300 indicates offset for acquiring a dataset at a position where a predetermined time has elapsed from the start of reproduction of the content.

Figure 17:
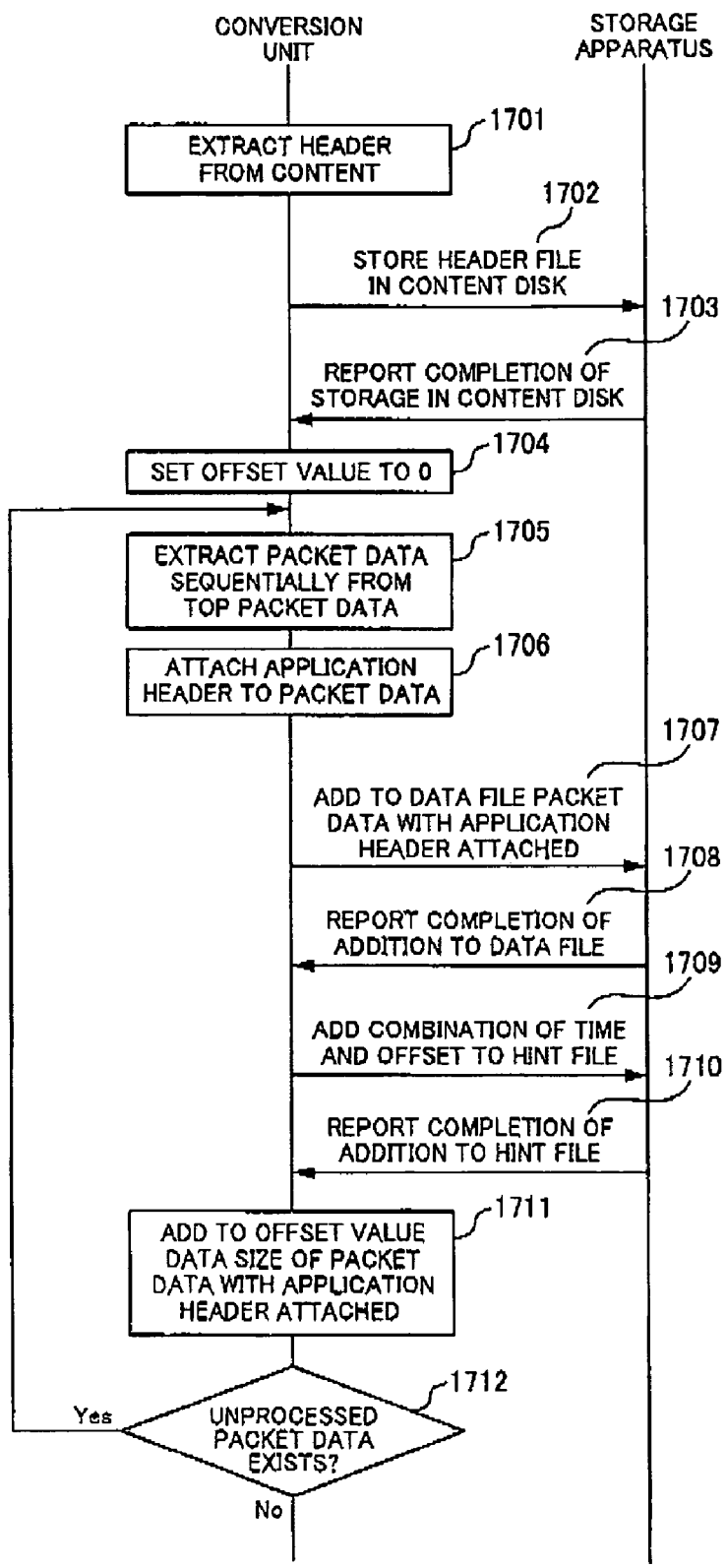
FIG. 17 is a sequence chart explaining conversion processing by a conversion unit in the delivery server according to an embodiment of this invention.

FIG. 17 is a sequence chart explaining the conversion processing by the conversion unit 113 in the delivery server 11 in this embodiment.

As shown in FIG. 17, the conversion unit 113 extracts the header 3010 from the acquired content and creates a header file 3100 (step 1701). The conversion unit 113 requests the storage apparatus 12 to store the created header file 3100 (step 1703), and the storage apparatus 12 stores the header file 3100 and then reports the completion of the storage processing to the conversion unit 113 (step 1703).

The conversion unit 113 sets an offset value to 0 (step 1704), then takes out a piece of packet data sequentially from the top of the packet data 3020 (step 1705), and attaches an application header 3210 to this piece of packet data 3020 (step 1706). The conversion unit 113 then requests the storage apparatus 12 to add to the data file the packet data with the application header 3210 attached (step 1707) and receives the completion report from the storage apparatus 12 (step 1708).

The conversion unit 113 then correlates the time included in this packet data 3020 with the offset value and adds the correlated data in the hint file 3300 (step 1709). When receiving the completion report from the storage apparatus 12 (step 1710), the conversion unit 113 adds to the offset value the size of the packet date with the application header 3210 attached to obtain a new offset value (step 1711).

The conversion unit 113 judges whether or not there is unprocessed packet data 3020 (step 1712) and returns to step 1705 if there is.

Figure 18:
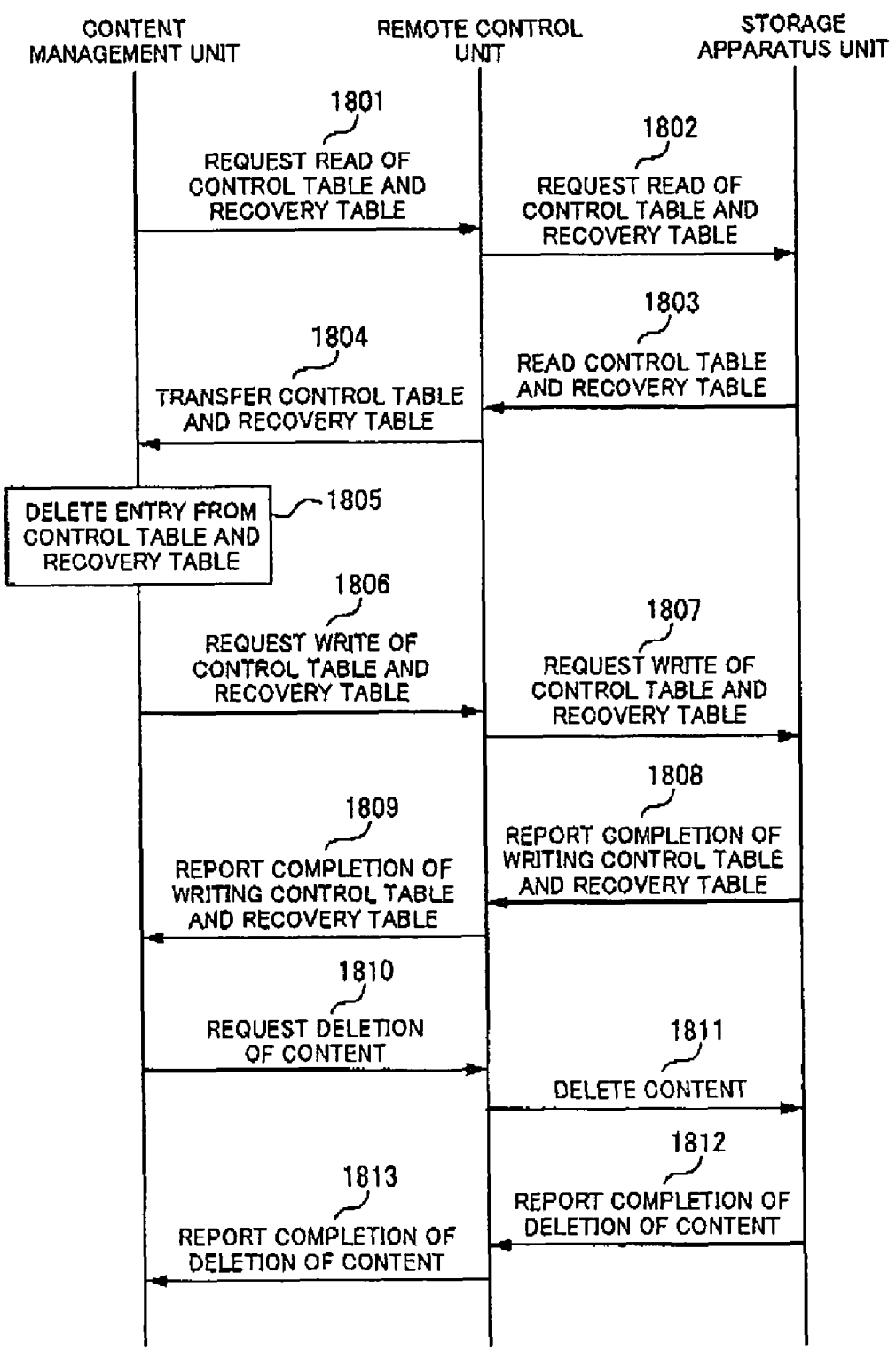
FIG. 18 is a sequence chart explaining content deletion processing in the content delivery system according to an embodiment of this invention.

FIG. 18 is a sequence chart explaining content deletion processing in the content delivery system 1 in this embodiment.

As shown in FIG. 18, the content management unit 133 requests the remote control unit 111 in the delivery server 11 to read the control table 500 and the recovery table 600 via the remote control unit 131 (step 1801). The remote control unit 111 receiving this request requests the storage apparatus 12 to read the control table 500 and recovery table 600 (step 1802), and the storage apparatus 12 reads the control table 500 and recovery table 600 from the link disk 121 and transfers the tables 500 and 600 to the remote control unit 111 (step 1803). The remote control unit 111 transmits the read control table 500 and recovery table 600 to the content management unit 133 via the remote control unit 131 in the management apparatus 13, and the content management unit 133 receives them (step 1804).

The content management unit 133 refers to the received control table 500 and recovery table 600, designates an entry to be deleted and deletes the entry (step 1805).

Next, the content management unit 133 requests the remote control unit 111 to write the control table 500 and recovery table 600 via the remote control unit 131 in order to update the control table 500 and recovery table 600 in the link disk 121 (step 1806).

Upon receiving this request, the remote control unit 111 in the delivery server 11 requests the storage apparatus 12 to write the control table 500 and recovery table 600 in the link disk 121, and the storage apparatus 12 writes the control table 500 and recovery table 600 in response to this request (step 1807). When the writing is complete, the storage apparatus 12 reports the content management unit 133 that the writing is complete via the remote control units 111 and 131 (step 1808 and step 1809).

The content management unit 133 then issues a content deletion request to the delivery server 11 via the remote control units 131 and 111 in order to delete the content from the content disk 122, the content and the content disk 122 being specified by the content ID and disk ID in the deleted entry (step 1810 and step 1811). With this processing, the remote control unit 111 in the delivery server 11 requests the storage apparatus 12 to delete the designated content from the content disk 122 (step 1811).

When the deletion of the designated content is complete, the storage apparatus 12 reports the completion of deletion processing to the content management unit 133 via the remote control units 111 and 131 (step 1812 and step 1813).

Figure 19:
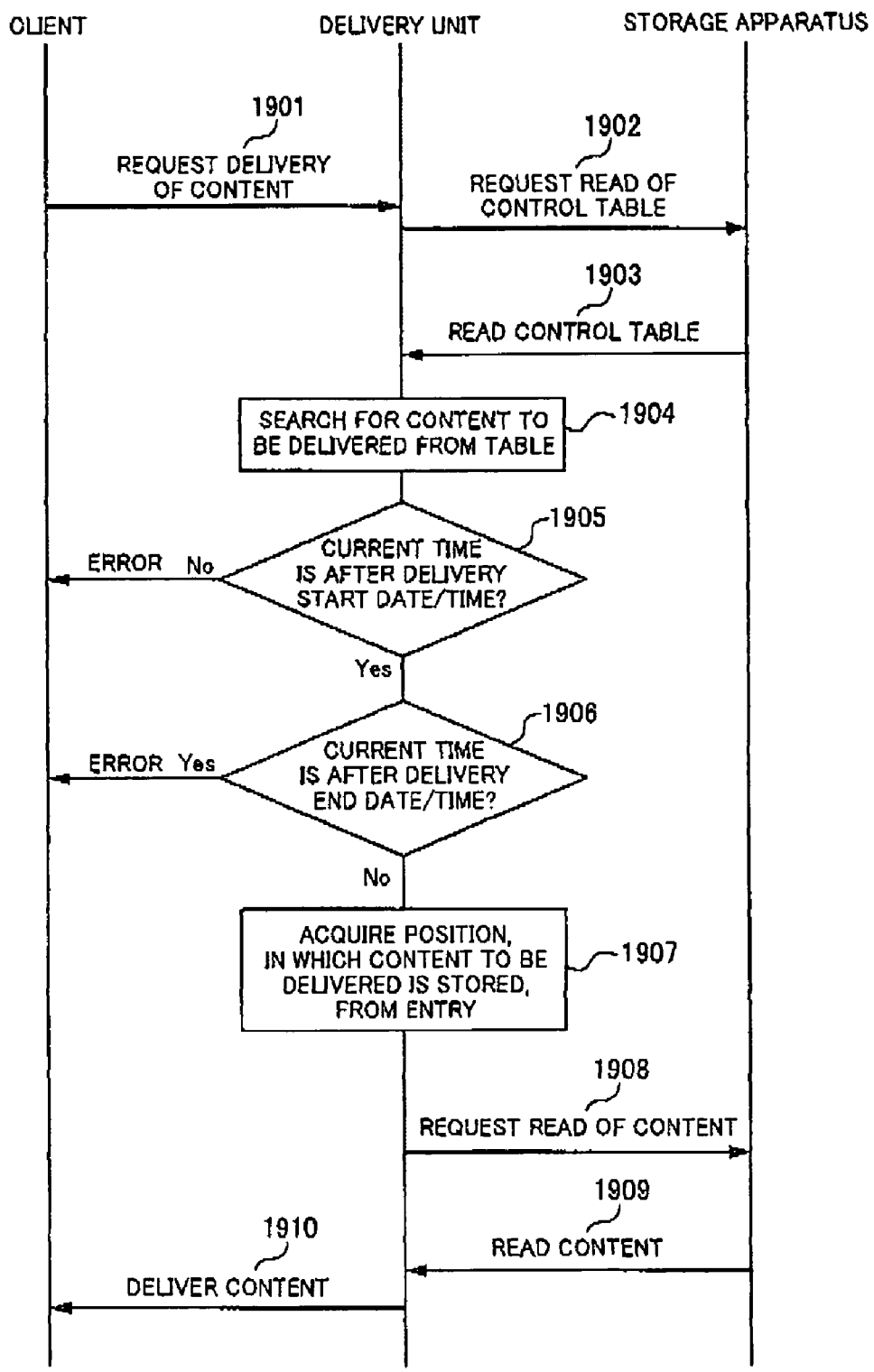
FIG. 19 is a sequence chart explaining content delivery processing in the content delivery system according to an embodiment of this invention.

FIG. 19 is a sequence chart explaining content delivery processing in the content delivery system 1 in this embodiment. The below description will be provided on the premise that the storage apparatus 12 holds the control table 500 and recovery table 600 shown in FIG. 5 in the link disk 121 and that the client 30 requests delivery of the content specified by "/newtitle/chapter04.Wmv."

Referring to FIG. 19, the client 30 transmits a delivery request for this content to the delivery server 11 (step 1901). The delivery unit 112 in the delivery server 11 issues to the storage apparatus 12 a read request for the control table 500 in response to the delivery request (step 1902) and reads the control table 500 from the link disk 121 (step 1903).

The delivery unit 12 refers to the read control table 500 and extracts an entry regarding the content designated by the delivery request (step 1904). Since the client 30 requests the delivery of the content specified by "/newtitle/chapter04.wmv" in this example, an entry having the reference name "/newtitle/chapter04.wmv" is extracted.

The delivery unit 112 then compares the delivery start date/time in the extracted entry with the current time (step 1904) and judges whether or not the current time is after the delivery start date/time (step 1905). If it is determined that the current time is not after the delivery start date/time (step 1905: No), the delivery unit 112 transmits an error status report to the client 30. In this example, the delivery start date/time of the requested content "/newtitle/chapter04.wmv" is "19:00 on Feb. 27, 2008," so if the time when the above comparison is performed is not after this time, it is determined to be an error. On the other hand, if it is determined that the current time is after the delivery start date/time (step 1905: Yes), then the delivery unit 112 then judges whether or not the current time is after the delivery end time (step 1906).

If it is determined that the current time is after the delivery end date/time (step 1906: Yes), the delivery unit 112 likewise transmits an error status report to the client 30. In this example, the delivery end time is "19:00 on Mar. 12, 2003," so if the time when the above judgment regarding the delivery end date/time is made is after this time, it is determined to be an error. On the other hand, if it is determined that the current time is after the delivery end date/time (step 1906: No), the delivery unit 112 acquires the position in which the content designated by this delivery request is stored (step 1907). In this example, the delivery unit 112 recognizes the storage position of the content to be delivered as being the content ID "B" in the content disk 122 identified by the disk ID "26."

The delivery unit 112 next transmits a read request for the content based on the acquired storage position to the storage apparatus 12 (step 1908) and reads the content from the content disk 122 in the storage apparatus (step 1909). Then the delivery unit 112 transmits the read content to the client 30 (step 1910).

As described above, the delivery server 11 receiving the content delivery request from the client judges the deliverable date/time of the content and delivers the content to the client only when the content is deliverable. In this case, since the content stored in the content disk 122 in the storage apparatus 12 has been converted to have the delivery format by the conversion program in the delivery server 11, the delivery server 11 does not have to convert the format for delivery every time a delivery request is issued, so the processing load can be reduced.

Figure 20:
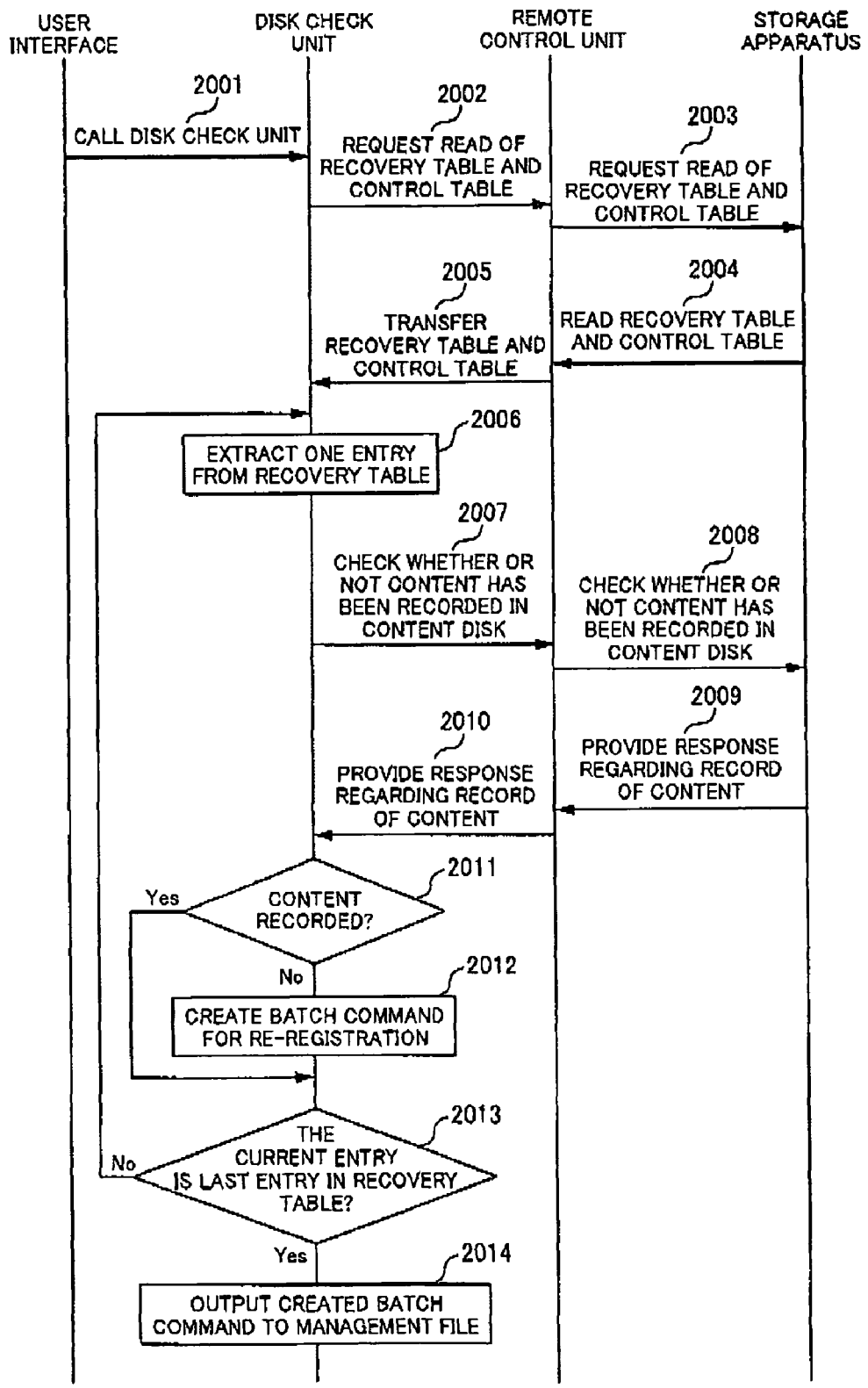
FIG. 20 is a sequence chart explaining disk check processing in the content delivery system according to an embodiment of this invention.

FIG. 20 is a sequence chart explaining disk check processing in the content delivery system 1 in this embodiment.

The disk check processing is performed for detecting and recovering from, when a failure such as an unexpected sudden power shutdown or device failure occurs, logical inconsistency in the logical unit. When such a failure occurs, the system administrator operates the user interface of the management apparatus 13 and calls the disk check unit 132 (step 2001). The disk check unit 132 requests, via the remote control unit 131, the remote control unit 111 in the delivery server 11 to read the control table 500 and recovery table 600 (step 2002). The remote control unit 111 reads the control table 500 and recovery table 600 from the link disk 121 in the storage apparatus 12 in response to the read request (step 2003), and transfers them to the disk check unit 132 (step 2004 and step 2005).

The disk check unit 132 extracts an entry from the received recovery table 600 (step 2006) and calls the remote control unit 111 in the delivery server 11 in order to check if the content identified by the content ID of this entry exists in the content disk 122 identified by the disk ID of this entry (step 2007).

The remote control unit 111 transmits a check request for the content of the content disk 122 (step 2008) and receives the check result (step 2009). The check result includes information regarding whether or not the designated content is recorded logically properly. The remote control unit 111 receiving this check result transfers it to the disk check unit 132 (step 2010).

The disk check unit 132 then judges whether or not the content is recorded properly based on the received check result (step 2011). If it is determined that the content is not recorded properly (step 2011: No), the disk check unit 132 creates a command for re-entering this content (step 2012). The disk check unit 132 creates a command based on the content of the entry extracted from the control table 500 and recovery table 600. Specifically, the reference name in the relevant entry is set as a reference name in the management file and the acquisition source in the relevant entry is set as a copy-source. The delivery start date/time and the delivery end date/time in the control table 500 are set respectively as delivery start date/time and delivery end date/time in a management file.

When the check of the content of the relevant entry is complete, the disk check unit 132 judges whether or not this entry is the last entry in the recovery table 600 (step 2013). If it is determined there is an entry left unprocessed (step 2013: No), the processing returns to step 2006 in order to check the content in the next entry. When the content check for all the entries in the recovery table 600 is complete (step 2013: Yes), the disk check unit 132 outputs the created command to the management file 700 (step 2014).

As described above, the system administrator can check if the content stored in the content disk 122 in the storage apparatus 12 has been recorded without any inconsistency by calling the disk check unit 132. Also, by executing the disk check program, the management file 700 is created, so the content management unit 133 acquires the content again from the origin server 20 based on this management file 700. Accordingly, even when content is lost due to a failure or the like in the content disk 122, the lost content can be recovered.

Another embodiment will be described. The following description will describe a content delivery apparatus 10 that detects a breakdown in the content disk 122 and automatically recovers from it.

Figure 21:
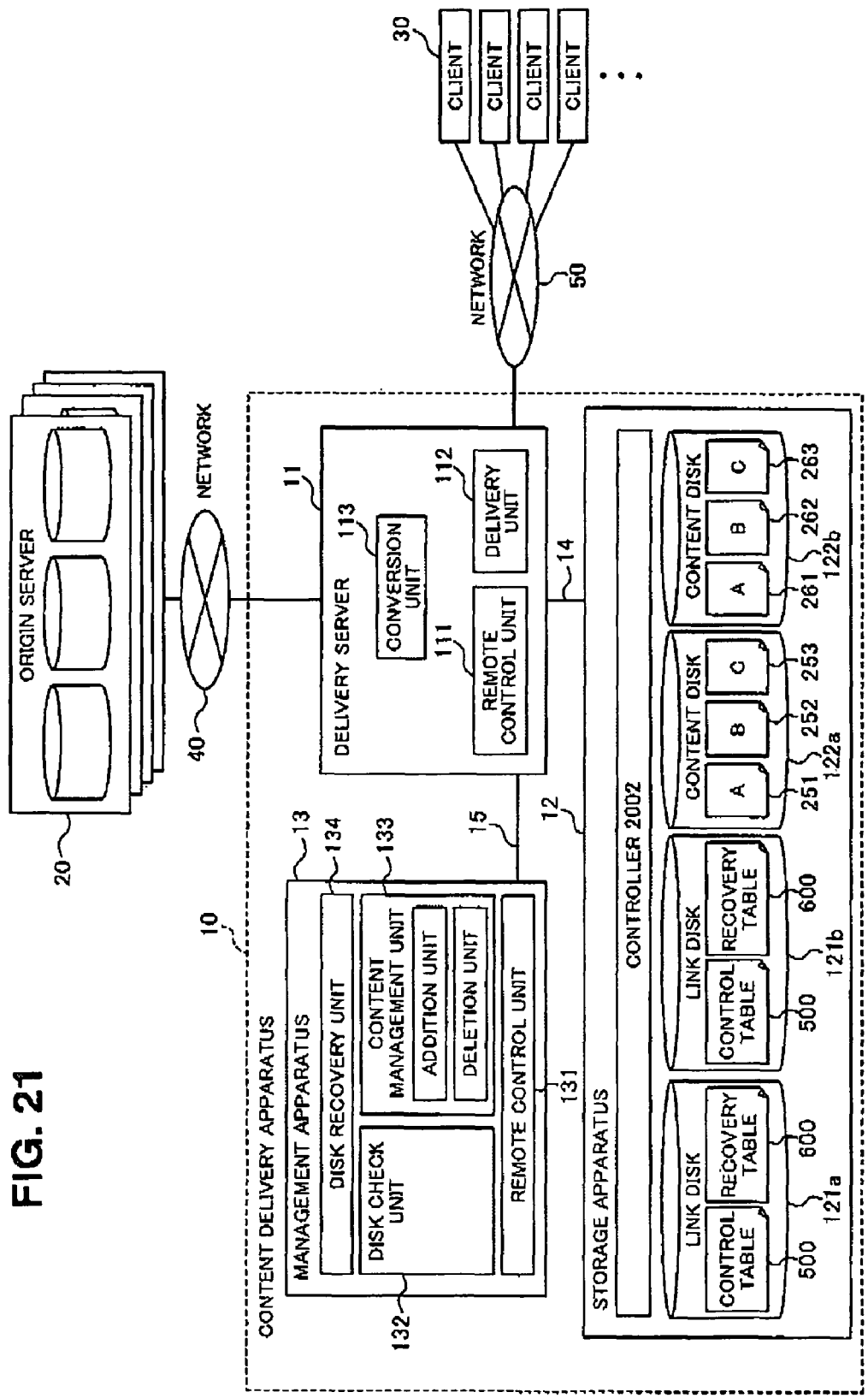
FIG. 21 is a diagram showing the configuration of the content delivery system according to an embodiment of this invention.

FIG. 21 is a diagram showing the configuration of a content delivery system according to this embodiment. As shown in FIG. 21, a management apparatus 13' in this embodiment includes a disk recovery unit 134.

The disk recovery unit 134 is realized by a program for automatically executing a procedure for recovering a content disk 122. In the above-described embodiment, the disk check unit 132 and the content management unit 133 are each called by the system administrator. In this embodiment, when a failure in the content disk 122 is detected, this failure is reported to the management apparatus 13' and the disk recovery unit 134 is called by that report. The storage apparatus 12 transmits an error status report when, for example, mount processing for the content disk 122 fails. The storage apparatus 12 may also transmit an error status report when content designated by a delivery request is damaged and so cannot be called. In addition, the storage apparatus 12 may transmit an error status report under the control of the content management unit 133 when a failure in the accessed content disk 122 is detected.

Figure 22:
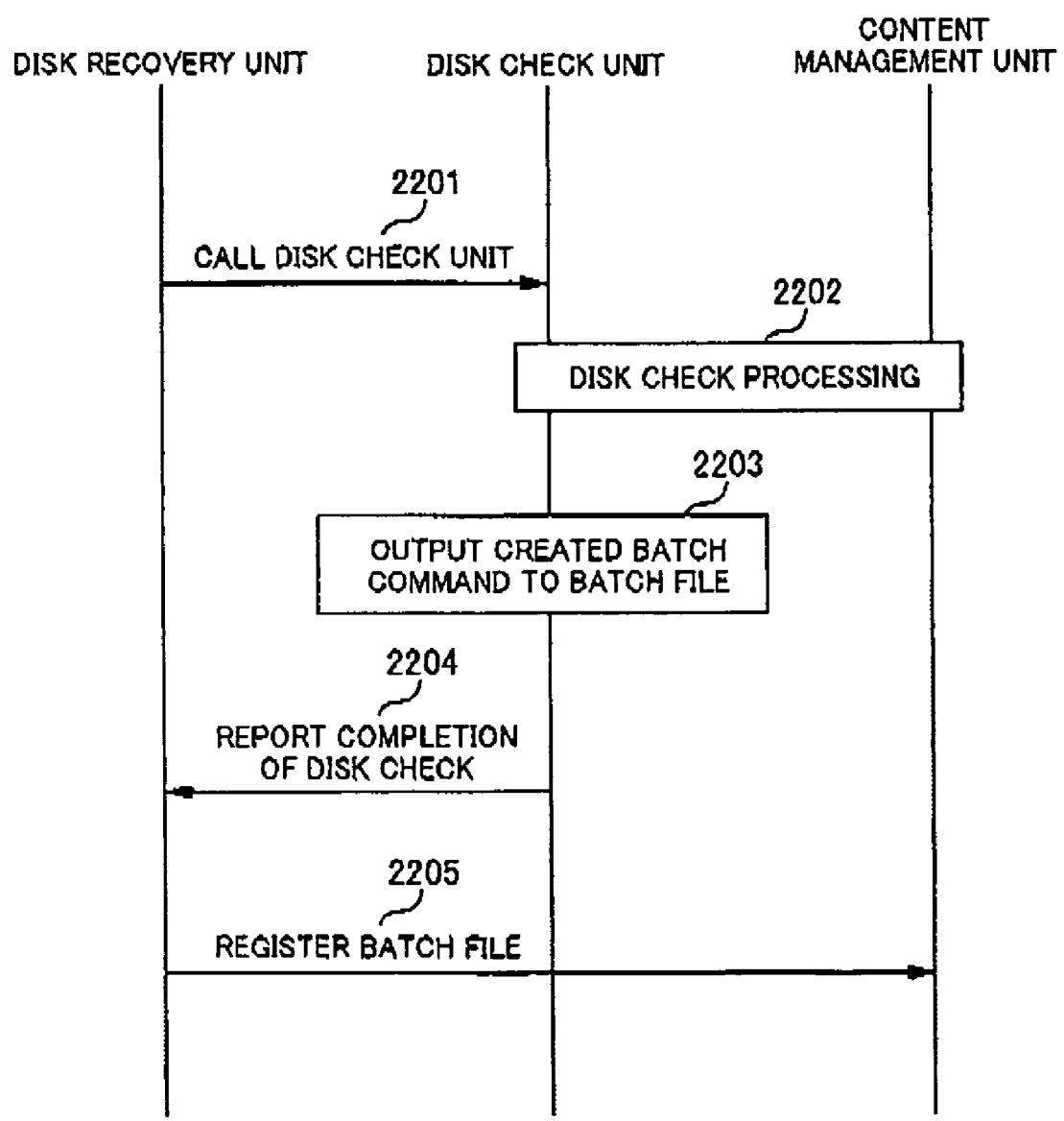
FIG. 22 is a sequence chart explaining disk recovery processing in the management apparatus according to an embodiment of this invention.

FIG. 22 is a sequence chart explaining disk recovery processing in the management apparatus 13' in this embodiment.

As shown in FIG. 22, the disk recovery unit 134 first calls the disk check unit 132 (step 2201). The called disk check unit 132 acquires the check result from the storage apparatus 12 as described above (step 2202), creates a batch command required for the recovery of the content disk 122 and outputs the batch command as a management file 700 (step 2203). Next, the disk check unit 132 reports the completion of the disk check processing to the disk recovery unit 134 (step 2204). When receiving the completion report, the disk recovery unit 134 commands the content management unit 133 to register the output management file 700 (step 2205).

Next, another embodiment will be described. The below description will describe a situation where the disk check unit 132 refers to the control table 500 and determines a moving image to be recovered.

As described above, the control table 500 contains the delivery start date/time and delivery end date/time. In this embodiment, the disk check unit 132 refers to the delivery start date/time and the delivery end date/time in the control table 500, judges whether or not recovery for content is needed, and decides a processing order if it is determined the recovery is needed.

FIG. 23 is a sequence chart explaining disk recovery processing in the management apparatus 13' according to this embodiment. Compared with FIG. 20 described above, it can be seen that the processing shown in steps 2312 and 2315 has been added.

The disk check unit 132 checks with the storage apparatus 12 if content in an entry extracted from the recovery table 600 is properly stored in the content disk 122 and receives the check result (step 2306 to step 2310). The disk check unit 132 judges whether or not content is properly stored based on the received check result (step 2311), and if it is determined that the content is not stored properly (step 2311: No), then the disk check unit 132 also checks whether or not the current time is after the delivery end date/time (step 2312).

If it is determined that the current time is not after the delivery end date/time (step 2312: No), the disk check unit 132 creates a batch command for re-registration (step 2313). On the other hand, if it is determined that the current time is after the delivery end date/time (step 2312: Yes), the disk check unit 132 does not create a batch command because there is no need for acquiring the content.

When the extraction of all the entries is complete (step 2314: Yes), the disk check unit 132 sorts the created batch commands in ascending order based on the delivery start dates/times (step 2315) and outputs the sorted batch commands to the management file 700 (step 2316).

As described above, in this embodiment, if content is not stored properly in the content disk 122, a management file 700 for acquiring this content from the origin server 20 again is created only when the current time is not after the delivery end date/time.

This invention can be widely applied in content delivery apparatuses for delivering content in accordance with delivery requests from clients.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A content delivery apparatus, comprising:
a delivery server;
a storage apparatus operatively coupled to the delivery server and including at least one logical unit for storing data regarding content items; and
a management apparatus operatively coupled to the delivery server and including a content management unit configured to manage the delivery server and the storage apparatus,
wherein the delivery server includes:
a conversion unit configured to acquire, in response to a content addition request from the content management unit, original data regarding a content item designated by the content addition request from an external origin server, to convert the acquired original data to converted data where the converted data comprises a header file, a data file including an application header, and a hint file including an offset for acquiring a dataset, and to store the converted data for delivery in a first logical unit; and
a delivery unit configured to read the converted data from the first logical unit in response to a content delivery request from a client for requesting delivery of the content item and to transmit the read converted data for delivery to the client.

2. The content delivery apparatus according to claim 1, wherein the storage apparatus includes a second logical unit configured to store a control table including control information regarding the delivery of the content items.

3. The content delivery apparatus according to claim 2, wherein the delivery unit controls delivery of the converted data in accordance with the control table stored in the second logical unit.

4. The content delivery apparatus according to claim 3, wherein the control table includes a deliverable time period specifying a time period during when the converted data from the original data regarding the content item can be delivered from the content delivery apparatus to the client, and wherein the delivery unit transmits, if the time when the content delivery request from the client is received is within the deliverable time period, the converted data to the client.

5. The content delivery apparatus according to claim 3, wherein the content management unit receives a management file containing a predetermined operation for the delivery server and transmits a content addition request to the conversion unit, if the predetermined operation contained in the management file is an addition operation.

6. The content delivery apparatus according to claim 5, wherein the management file includes an operation execution time for executing the predetermined operation, and wherein the content management unit executes the predetermined operation depending on the operation execution time.

7. The content delivery apparatus according to claim 5, wherein the management file contains the deliverable time period, and wherein the content management unit controls the delivery server to register the deliverable time period in the control table.

8. The content delivery apparatus according to claim 5, wherein the management file contains an acquisition-source address for the content item, and wherein the conversion unit acquires the original data regarding the content item from the origin server based on the acquisition-source address.

9. The content delivery apparatus according to claim 8, wherein the second logical unit stores a recovery table created based on the acquisition-source address.

10. The content delivery apparatus according to claim 9, wherein the management apparatus further includes a check unit configured to check whether the storage apparatus is in an error state; and wherein the content management unit requests the conversion unit to re-acquire the content based on the recovery table, if the check unit determines that the storage apparatus is in an error state.

11. A content delivery method using a content delivery apparatus that includes a delivery server, a storage apparatus operatively coupled to the delivery server and a management apparatus operatively coupled to the delivery server, the method comprising:

transmitting, under control of the management apparatus, a content addition request to the delivery server in accordance with a management file;

acquiring, under control of the delivery server, in response to the content addition request, original data regarding a content item designated by the content addition request from an external origin server, converting, under control of the delivery server, the acquired original data to converted data where the converted data comprises a header file, a data file including an application header, and a hint file including an offset for acquiring a dataset;

storing, under control of the delivery server, the converted data for delivery in a logical unit formed in the storage apparatus; and reading, under the delivery server, from the logical unit the converted data for delivery in response to a content delivery request transmitted from a client and transmitting the read converted data for delivery to the client.

* * * * *